(12) United States Patent
Herington et al.

(10) Patent No.: US 9,432,443 B1
(45) Date of Patent: Aug. 30, 2016

(54) MULTI-VARIATE COMPUTER RESOURCE ALLOCATION

(75) Inventors: Daniel Edward Herington, Dallas, TX (US); James Mark Coffey, Dallas, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1734 days.

(21) Appl. No.: 11/669,708

(22) Filed: Jan. 31, 2007

(51) Int. Cl.
*G06F 15/173* (2006.01)
*H04L 12/911* (2013.01)
*H04L 29/08* (2006.01)
*H04L 12/24* (2006.01)

(52) U.S. Cl.
CPC .............. *H04L 67/10* (2013.01); *G06F 15/173* (2013.01); *H04L 41/0813* (2013.01); *H04L 41/50* (2013.01)

(58) Field of Classification Search
USPC ........................................................ 709/226
See application file for complete search history.

(56) References Cited

U.S. PATENT DOCUMENTS

| | | | |
|---|---|---|---|
| 5,675,797 A * | 10/1997 | Chung et al. ................. | 718/104 |
| 5,881,268 A | 3/1999 | McDonald et al. | |
| 7,159,217 B2 | 1/2007 | Pulsifer et al. | |
| 7,167,854 B2 | 1/2007 | Maciel et al. | |
| 2003/0120792 A1 * | 6/2003 | Celik et al. ..................... | 709/231 |
| 2004/0100984 A1 * | 5/2004 | Nam et al. ...................... | 370/438 |
| 2004/0181794 A1 * | 9/2004 | Coleman et al. ............. | 718/104 |
| 2004/0193476 A1 * | 9/2004 | Aerdts ............................ | 705/10 |
| 2004/0204961 A1 * | 10/2004 | Rensimer et al. ................ | 705/2 |
| 2004/0205167 A1 * | 10/2004 | Grumann ...................... | 709/220 |
| 2005/0021530 A1 * | 1/2005 | Garg et al. ................... | 707/100 |
| 2005/0102387 A1 * | 5/2005 | Herington ..................... | 709/223 |
| 2006/0026179 A1 * | 2/2006 | Brown et al. ................. | 707/100 |
| 2006/0026599 A1 * | 2/2006 | Herington et al. ............ | 718/105 |
| 2006/0031242 A1 * | 2/2006 | Hall et al. ..................... | 707/101 |
| 2006/0074970 A1 * | 4/2006 | Narayanan et al. ........... | 707/102 |
| 2006/0149652 A1 * | 7/2006 | Fellenstein et al. ............ | 705/35 |
| 2006/0150191 A1 * | 7/2006 | Masuda et al. ................ | 718/105 |
| 2006/0161883 A1 * | 7/2006 | Lubrecht et al. .............. | 717/104 |
| 2006/0161884 A1 * | 7/2006 | Lubrecht et al. .............. | 717/104 |
| 2006/0167886 A1 * | 7/2006 | Kantesaria et al. ............ | 707/10 |
| 2006/0235675 A1 * | 10/2006 | Oslake et al. ................. | 703/21 |
| 2006/0294228 A1 * | 12/2006 | Almstrom ..................... | 709/224 |
| 2007/0078960 A1 * | 4/2007 | Dawson et al. ............... | 709/223 |
| 2007/0100793 A1 * | 5/2007 | Brown et al. ..................... | 707/2 |
| 2007/0130231 A1 * | 6/2007 | Brown et al. ................. | 707/204 |
| 2007/0174346 A1 * | 7/2007 | Brown et al. ................. | 707/200 |
| 2007/0180453 A1 * | 8/2007 | Burr et al. ..................... | 718/105 |
| 2007/0271570 A1 * | 11/2007 | Brown et al. ................. | 718/105 |
| 2008/0028409 A1 * | 1/2008 | Cherkasova et al. .......... | 718/104 |
| 2008/0133608 A1 * | 6/2008 | Brown et al. ................. | 707/200 |

* cited by examiner

*Primary Examiner* — Ninos Donabed
(74) *Attorney, Agent, or Firm* — Clifton L. Anderson

(57) ABSTRACT

The present invention provides a method for multi-variate allocation of hardware resources to workloads on a computer system as a function of load and at least one of performance and utilization.

4 Claims, 1 Drawing Sheet

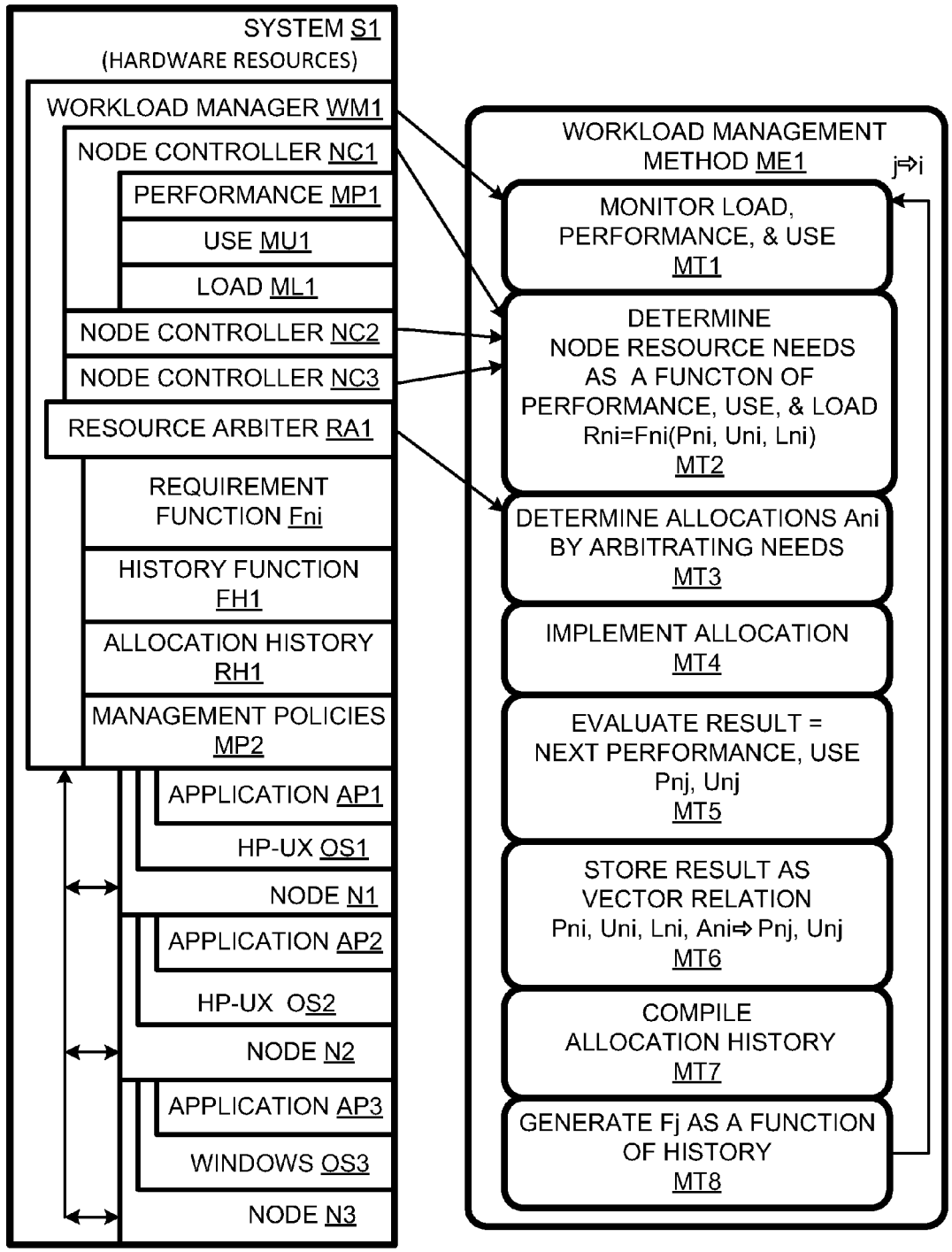

US 9,432,443 B1

MULTI-VARIATE COMPUTER RESOURCE ALLOCATION

BACKGROUND OF THE INVENTION

Some multi-processor computer systems allow hardware resources to be dynamically distributed among multiple workloads according to management policies. Typically, management policies define a goal for a control-algorithm metric. The metric typically involves a performance parameter (such as response time) or a utilization parameter (such as a percentage of available processor cycles, memory capacity, or communications bandwidth). When a workload management program detects that the goal is not being met, resources are reallocated in an attempt to meet that goal.

Herein, related art is presented to aid in understanding the present invention. Related art labeled "prior art" is admitted prior art; related art not labeled "prior art" is not admitted prior art.

BRIEF DESCRIPTION OF THE DRAWINGS

The following FIGURE is of an implementation or an embodiment of the invention and is not a depiction of the invention itself.

FIG. 1 is a combination schematic diagram and flow chart in accordance with embodiments of the invention.

DETAILED DESCRIPTION

In the course of the present invention, it was noted that the response of a performance or use metric to a change in resources can be variable. For example, in some cases doubling resources available to a workload reduces response time by 50%, while in other cases, the reduction is significantly more or less than 50%. In the case of an under-correction (i.e., reduction is less than intended), one or more additional corrections may be required to meet a goal. In the meantime, the duration over which the goal is not met persists longer than necessary, increasing the extent and/or risk of unsatisfactory performance.

While an over-correction (more resources transferred than needed to meet specifications) does not usually impact the target workload adversely, the performance of a workload that relinquished the resources to the target workload could suffer more than necessary. This could require a reallocation in the opposite direction, and possible undesirably oscillating corrections. The present invention strives to reduce problems due to over- and under-corrections.

The present invention gathers historical data regarding the magnitude of the effects of resource reallocations with an end to determine resource consumption profiles on a per workload basis. In the course of the present invention, it was discovered that such profiles are often load dependent. Hence, load data is gathered along with control-metric data to provide more accurate predictions of the effects of hardware reallocations.

Examples of load parameters include the number of users accessing a system or the number of transactions being initiated per unit time. Examples of performance parameters include average transaction response time or the total response time for a series of transactions (e.g., a user session). Examples of utilization can include percentage of available processor cycles, communications bandwidth or memory capacity used.

FIG. 1 depicts a particular computer system S1 having a workload manager WM1 and plural nodes among which hardware resources can be distributed. Each node N1-N3 is shown having a respective operating system OS1-OS3, and a respective application program AP1-AP3. A node can be a stand-alone system, a hard partition, a virtual partition, a virtual machine, or any other division of a computer system on which a workload can run. Note that a node can have several applications, virtual machines, and processes running on its operating system. Also, an operating system can run on each virtual machine, so a node can host more than one operating system.

Workload manager WM1 includes node controllers NC1-NC3 and a resource arbiter RA1. Node controllers NC1-NC3 respectively monitor nodes N1-N3 and determine their respective resource requirements as a history function FH1 of an allocation history RH1. To this end, node controller NC1 includes a performance monitor MP1, a use monitor MU1, and a load monitor ML1. Node controllers NC2 and NC3 similarly include respective performance monitors, user monitors, and load monitors. Resource arbiter RA1 determines and implements resource allocations among nodes N1-N3. In the event that hardware resources are insufficient to fully satisfy the requirements for all nodes, resource arbiter "arbitrates" as a function of management policies to determine the allocation to be implemented.

Workload manager WM1 implements a method ME1, flow charted in FIG. 1. At ongoing method segment MT1, node controllers NC1 monitor performance, utilization (use), and load parameters. In particular, workload monitors MP1, MU1, and ML1 monitor their respective parameters on a per-node basis.

At method segment MT2, node controllers NC1-NC3 determine, e.g., calculate, hardware requirements for each node N1-N3 according to management policies MP2 and as a function of allocation history RH1. The node requirement determinations $R_{ni}$ (n=1, 2, 3 and designate nodes; i, j=1, 2, 3, . . . and refer to iteration numbers) are multi-variate in that they are a function of load and at least one of performance and use. For example, the requirements can be a function of transaction rate, processor utilization, and response time for each application on each node. The resources allocated can relate to processors, memory and other storage, communications bandwidth, etc. The invention provides for a range of different allocation quanta, e.g., full processors versus fractional processors (e.g., in the form of processor cycles).

Once node requirements are determined, resource arbiter RA1 determines the allocation of hardware resources to nodes at method segment MT3. Of course, if resources are sufficient, the requirements of all nodes should be met. If the resources are insufficient to fully meet all requirements, resource arbiter allocates resources to partially meet requirements, as dictated by management policies. The resource allocation determinations $A_{ni}$ are multivariate in that the determined allocation is a function of the requirements determinations, which are multi-variate. Once the allocation is determined, it is implemented at method segment MT4.

At method segment MT5, load, utilization, and performance are measured to determine the impact of the allocation. Utilization or performance or both are evaluated as a function resources, load, absolute and differential performance, and absolute and differential use. This data is stored in allocation history RH1, at method segment MT6. This data is statistically compiled with prior result measurements at method segment MT7. The compilation can also be stored in result history RH1.

The result statistics are used to predict the impacts on performance and use of changes in use and performance for given performance, use, and load levels. From these predictions, a new requirement functions $F_{nj}$ are computed for each node. The new requirement functions $F_{nj}$ serve as the requirement functions for the next iteration of method ME1. In FIG. 1, $F_j$ for one iteration becomes $F_i$ for the next iteration.

In one scenario, response time for workload WL1 is 6 seconds and management policies require a reallocation to bring the response time to 5 seconds or less. Node N1 currently has one processor assigned to it. Assuming a linear response to additional processor cycles, 0.2 processors should be added to node N1. However, historical data indicates that, while workload WL1 response linearly to changes in processing capacity when the load level is 100 transactions per second, it responds less than linearly when the load level is 200 transactions per second. In this case, the load level is 200 transactions per second, which the history indicates requires a 0.4 processor increase to force the response time to 5 seconds or below. Thus, the invention allows such load dependencies to be taken into account so that the effects of an allocation are more predictable.

In a variant of the foregoing scenario, the requirement function of load and performance is partially computed to yield an intermediate allocation function of load only. Then the load level is rechecked. The allocation level is the intermediate function evaluated for the new load level. This approach allows recent changes in load level to be taken into account in determining resource requirements and allocations.

In the foregoing, allocations are determined as a function of requirements and management policies that provide for arbitration of node requirements. If resources are sufficient, the allocations are direct functions of load and at least one of performance and use. If resources are insufficient, the allocations can be indirect functions of load and at least one of performance and use. Thus, the present invention provides for both direct and indirect multi-variate functions.

In general, by taking more variables and historical data into account, the present invention provides for more accurate predictions of the impact of a given allocation or reallocation. This, in turn, allows policies to be met in fewer reallocations, resulting in better performance overall. The present invention provides for embodiments in which multi-variate determinations of hardware resources are used to allocate hardware resources among physically separate nodes, in other words, systems with multiple stand-alone computers, each with one or more nodes. The disclosed variations and other modifications to the illustrated embodiments are provided for by the present invention, the scope of which is defined by the following claims.

What is claimed is:

1. A computer-implemented multi-variate workload management method comprising:
   tracking response time and transaction rates as a function of time for respective workloads over a duration in which hardware resource allocations to said workloads have changed to obtain allocation histories to determine impacts of transaction rates on the responsiveness of response time to changes in resource allocations;
   determining hardware requirements for respective workloads based at least in part on said impacts of transaction rates and on management policies, said management policies specifying criteria for allocating said resources among said workloads, said criteria include required response times for respective workloads and arbitration criteria for arbitrating among competing hardware resource requirements for said workloads when not all of the hardware resource requirements can be met;
   determining an allocation of hardware resources to said workloads based on said hardware requirements and said management policies; and
   implementing said allocation on said computer system.

2. A method as recited in claim 1 wherein:
   said transaction rates are numbers of transactions being initiated per unit time; and
   said response times are average response times associated with said transactions.

3. A computer system comprising:
   hardware resources;
   plural nodes among which said hardware resources can be allocated;
   plural workloads running on said plural nodes;
   management policies for specifying criteria for allocating said resources among said workloads, said criteria including required response times for respective workloads and arbitration criteria for arbitrating among competing hardware resource requirements for said workloads when not all of the hardware resource requirements can be met;
   allocation histories representing changes in response time as functions of time, resource allocations, and transaction rates; and
   a workload manager to:
      determine hardware requirements for respective workloads based at least in part on said management policies and an impact of said transaction rates on responsiveness of response times to changes in resource allocations, said impact being determined from said allocation histories; and
      allocate hardware resources according to the determined hardware requirements.

4. A computer system as recited in claim 3 wherein:
   said transaction rates are numbers of transactions being initiated per unit time; and
   said response times are average response times associated with said transactions.

* * * * *